United States Patent [19]
El-Ibiary

[11] Patent Number: 5,899,321
[45] Date of Patent: May 4, 1999

[54] TAKE-UP FRAME ASSEMBLY FOR PLACING A CONVEYOR UNDER CONSTANT TENSION

[75] Inventor: Yehia El-Ibiary, Simpsonville, S.C.

[73] Assignee: Reliance Electric Industrial Company, Cleveland, Ohio

[21] Appl. No.: 08/738,954

[22] Filed: Oct. 24, 1996

[51] Int. Cl.⁶ .................................................. B65G 39/16
[52] U.S. Cl. ................ 198/807; 198/810.03; 198/810.04
[58] Field of Search .............................. 198/807, 810.03, 198/810.04, 813

[56] References Cited

U.S. PATENT DOCUMENTS

| | | |
|---|---|---|
| 2,791,474 | 5/1957 | Richard . |
| 2,914,957 | 12/1959 | Johnson ............................. 198/807 X |
| 4,212,502 | 7/1980 | Ames et al. . |
| 4,325,588 | 4/1982 | Elliott, Jr. et al. . |
| 4,433,878 | 2/1984 | Rosenthal . |
| 4,676,670 | 6/1987 | Nisley . |
| 4,860,634 | 8/1989 | Hein ................................... 198/807 X |
| 5,503,265 | 4/1996 | Hussar et al. ................. 198/810.03 X |
| 5,513,747 | 5/1996 | Hulse et al. ...................... 198/810.03 |
| 5,641,058 | 6/1997 | Merten et al. .................... 198/810.04 |

FOREIGN PATENT DOCUMENTS

| | | | |
|---|---|---|---|
| 1247938 | 8/1967 | Germany ............................. 198/807 |
| 834014 | 5/1960 | United Kingdom .................. 198/807 |
| 920775 | 3/1963 | United Kingdom .................. 198/807 |

OTHER PUBLICATIONS

Conveyor Components Company; Belt Alignment Switch brochure, Bulletin TA-94; Croswell, Michigan, 1994.

Bryant Products, Inc.; Telescoper Conveyor Products brochure; Ashippun, Wisconsin, 1993.

*Primary Examiner*—James R. Bidwell
*Attorney, Agent, or Firm*—Timothy A. Cassidy; John J. Horn; John M. Miller

[57] ABSTRACT

The present invention is generally directed to a take-up frame assembly that is adapted to maintain a conveyor belt under constant tension. The take-up frame assembly, in one embodiment, can include a fluid cylinder having a retractable piston. The piston is interconnected with a bearing mounted to a shaft supporting the conveyor belt. The fluid cylinder includes a fluid regulator which can be used to maintain constant pressure within the cylinder and to thus apply a constant force to the bearing. The take-up frame assembly can also be used in combination with a controller and belt alignment devices which sense the relative position of the conveyor belt. When the conveyor belt falls out of alignment, the controller is capable of varying the pressure within the fluid cylinders in order to realign the belt.

20 Claims, 4 Drawing Sheets

000000
TAKE-UP FRAME ASSEMBLY FOR PLACING A CONVEYOR UNDER CONSTANT TENSION

FIELD OF THE INVENTION

The present invention generally relates to conveyor belt assemblies, and more particularly to take-up frame assemblies that not only maintain a conveyor belt in alignment, but also maintain the conveyor belt under constant tension.

BACKGROUND OF THE INVENTION

The present invention is generally directed to conveyor belt assemblies used to transport materials from one location to another. Conventional conveyor belt assemblies typically include an endless loop-type conveyor belt, wherein at least one end of the belt is supported by a shaft-mounted pulley having an adjustable position. The pulley shaft is adjustable in a manner that increases or decreases the amount of tension applied to the conveyor belt. The assembly used to adjust the position of the shaft is referred to as a "take-up frame."

Generally, take-up frames of the prior art have assumed one of several configurations. For example, in one common embodiment, the take-up frame includes a pair of opposing bearings mounted to respective ends of a pulley shaft. Each of the bearings are secured to a bearing block which is slidably supported by a corresponding frame member positioned adjacent to the conveyor belt. The bearing block is movable within the frame member in a direction perpendicular to the shaft. Each of the bearing blocks are held in place at a particular position within the frame member by a take-up screw. By rotating the take-up screw and moving the position of the bearing block, greater or lesser tension can be placed on the conveyor belt. Such conventional take-up frames are disclosed, for instance, in U.S. Pat. No. 2,791,474 to Richard and in U.S. Pat. No. 4,212,502 to Ames et al.

These "screw-type" take-up frames are generally configured to place the pulley shaft in a set position. Thus, the take-up frame will not compensate for expansion and contraction of the belt due to temperature fluctuations or for other reasons. Insufficient tension or excess tension placed on the belt can sometimes lead to belt slippage, belt misalignment, or other undesirable effects.

In addition, "screw-type" take-up frames also cannot readily counteract the effect of shock loading. Shock loading occurs when a foreign object, such as a rock, tool or other object, travels on the return side of the belt and gets caught between the belt and one of the pulleys, causing a substantial increase in tension on the belt. Shock loading can damage the belt and the components of the take-up frame assembly itself.

Various attempts have been made to create a take-up frame that will compensate for the above described irregularities that may occur when the conveyor belt is running. For instance, Bryant Products, Inc. of Ashippun, Wis. markets a take-up frame known as the TELESCOPER. This particular take-up frame employs a spring that applies a force to a pulley shaft supporting a conveyor belt. The spring compensates for some fluctuations that occur as the conveyor is moving. By incorporating a spring, the take-up frame applies greater tension to the conveyor belt as the spring is compressed.

Previously, the assignee of the present invention built and sold a take-up frame assembly designed specifically to cushion the stresses placed on a conveyor belt caused by a chain drive. The take-up frame assembly included a bearing and bearing block connected to a hydraulic cylinder. The hydraulic cylinder was placed in communication with an accumulator. In this arrangement, the hydraulic cylinder acted much like a spring.

Although the above-discussed prior art has provided great advances in take-up frames for conveyor belt assemblies, there is room for further improvement. In particular, a need exists for a take-up frame that maintains a conveyor belt under substantially constant tension, even during conveyor belt expansion or contraction or during shock loading. The present invention is directed to improved take-up frame assemblies that not only place a conveyor belt under substantially constant tension, but also provide a means for gauging the amount of tension in the belt.

SUMMARY OF THE INVENTION

The present invention recognizes and addresses the foregoing disadvantages, and others of prior art constructions and methods. Accordingly, it is an object of the present invention to provide an improved conveyor belt assembly.

Another object of the present invention is to provide an improved take-up frame assembly for maintaining a conveyor belt under substantially constant tension.

It is another object of the present invention to provide a take-up frame assembly that gives an indication of the amount of tension in a conveyor belt associated with the take-up frame.

Still another object of the present invention is to provide a take-up frame assembly that incorporates an integrated fluid cylinder and fluid regulator for applying a substantially constant force to an end of a shaft.

Another object of the present invention is to provide a take-up frame assembly that maintains a conveyor belt in substantially constant alignment.

Still another object of the present invention is to provide a take-up frame assembly that cushions a conveyor belt when the belt is exposed to shock loading.

These and other objects of the present invention are achieved by providing a take-up frame assembly adapted to supply a substantially constant force to a load bearing shaft. The take-up frame assembly includes a bearing adapted to rotatably receive the shaft in a first direction and being movable in a second direction substantially perpendicular to the first direction. The bearing is interconnected with a fluid cylinder having a retractable piston. The fluid cylinder includes a fluid inlet for receiving a pressurized fluid such that, when a pressurized fluid is introduced into the cylinder, the piston applies a force to the bearing in the second direction.

The take-up frame assembly further includes a fluid regulator in communication with the fluid inlet for controlling the pressure of a fluid within the cylinder. The fluid regulator can be used to maintain a fluid at a substantially constant pressure within the cylinder, causing the piston to apply a substantially constant force to the bearing. The fluid cylinder which can be a pneumatic cylinder or a hydraulic cylinder can be used in conjunction with a pressure gauge for indicating the pressure of the fluid within the cylinder. When the fluid cylinder is a hydraulic cylinder, the take-up frame assembly can include a hydraulic circulation loop including a fluid reservoir and a hydraulic pump for supplying hydraulic fluid to the cylinder.

In one embodiment, the take-up frame assembly can include a bearing frame into which the bearing is movably secured. The bearing frame can include guide elements defining an elongated channel along which the bearing is movable. For instance, the bearing can be mounted to a bearing block which includes slots that mate with the guide elements.

The present invention is also directed to a conveyor belt assembly which includes a conveyor belt having an end supported by a rotatable shaft. A first bearing is mounted to the first end of the rotatable shaft and a second bearing is mounted to the second end of the rotatable shaft. A pair of opposing tension adjustment devices are respectively interconnected with each bearing for supplying a force to each end of the rotatable shaft. By applying a force to the shaft, the conveyor belt is brought under tension.

In order to maintain the conveyor belt in alignment, the conveyor belt assembly can include a first conveyor alignment device for sensing the position of one edge of the conveyor belt and a second conveyor alignment device for sensing an opposite edge of the conveyor belt. A controller can be configured to receive information from both of the conveyor alignment devices regarding the position of the conveyor belt. The controller can also be configured to independently control the tension adjustment devices for altering the force applied to each end of the rotatable shaft in order to maintain the conveyor belt in substantially constant alignment.

In one embodiment, the tension adjustment devices include fluid cylinders having retractable pistons interconnected with each of the bearings. The fluid cylinders can include fluid regulators for providing a means by which substantially constant pressure is maintained within the cylinders for, in turn, applying a predetermined amount of force to each end of the rotatable shaft. The controller, which can be a microprocessor, can be electronically connected to the fluid regulators.

The present invention is also directed to a process for placing a conveyor belt under substantially constant tension and for maintaining the belt in alignment. The process includes the steps of providing an endless loop conveyor belt having an end supported by a rotatable shaft. The rotatable shaft includes a first end and a second end, each located laterally of the belt direction. A substantially constant force is placed on the first end of the rotatable shaft and on the second end of the rotatable shaft. By applying a substantially constant force to each end of the rotatable shaft, the conveyor belt is placed under substantially constant tension.

The process further includes the steps of sensing the position of a first edge of the conveyor belt and sensing the position of a second edge of the conveyor belt opposite to the first edge. Information regarding the position of the conveyor belt is then sent to a controller. When the conveyor belt falls out of alignment, the controller adjusts the force applied to the first and second ends of the rotatable shaft in a manner such that the conveyor belt realigns.

Other objects, features and aspects of the present invention are discussed in greater detail below.

BRIEF DESCRIPTION OF THE DRAWINGS

A full and enabling disclosure of the present invention, including the best mode thereof, to one skilled in the art, is set forth more particularly in the remainder of the specification, including reference to the accompanying drawings, in which.

Figure 1:
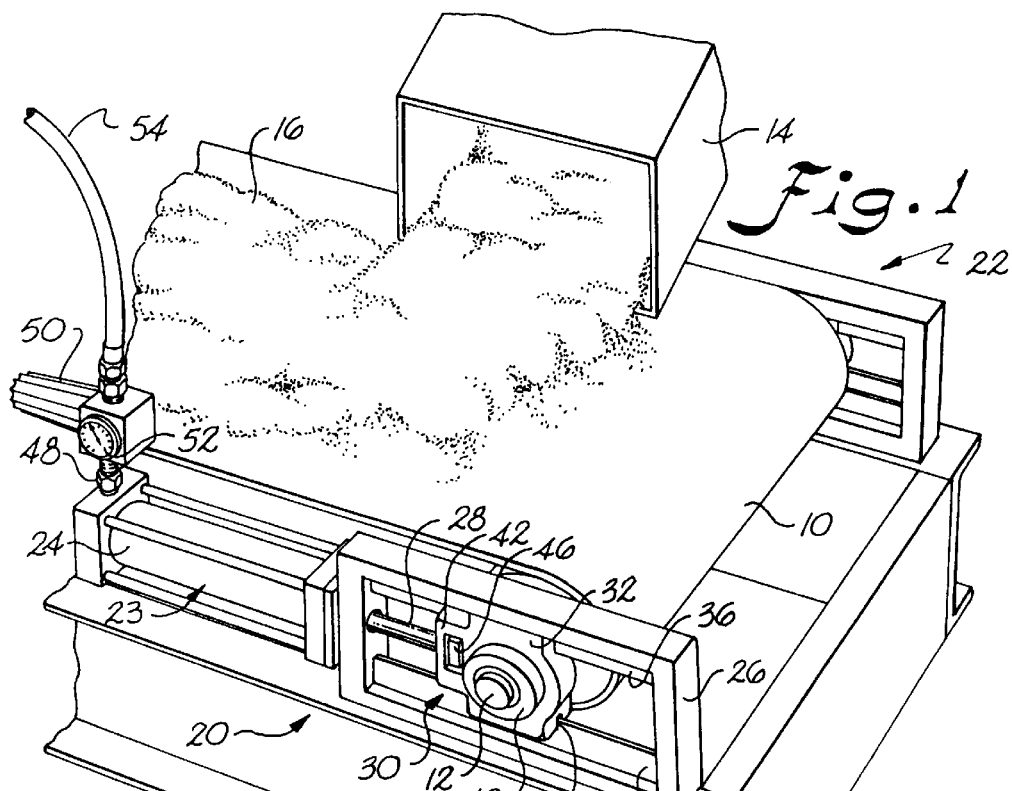
FIG. 1 is a perspective view with cut away portions of a conveyor belt assembly made in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

The present invention is generally directed to conveyor assemblies and, more particularly, to take-up frames for conveyor systems. In a preferred embodiment, the take-up frame assembly of the present invention includes a fluid cylinder having a retractable piston interconnected with a rotatable shaft supporting a conveyor belt. The fluid cylinder is integrated with a fluid regulator which regulates and controls the pressure of a fluid within the cylinder. By maintaining a fluid at a substantially constant pressure within the fluid cylinder, the retractable piston applies a substantially constant force to the shaft thereby maintaining the conveyor belt under substantially constant tension.

Through the configuration of the present invention, many advantages and benefits are obtained. For instance, the take-up frame assembly facilitates uniform tension on the conveyor belt by applying a substantially constant force to a rotatable shaft supporting the belt. By controlling tension, overloading of the belt, the pulleys and the bearings may be prevented. The take-up frame assembly also acts as a shock absorber in cushioning the conveyor belt when shock loading occurs or when the belt is stretched or relaxed, such as due to loads placed on the belt, eccentricities in the pulleys, or temperature fluctuations. The device of the present invention is easy to adjust and can even be used to automatically maintain a conveyor belt in alignment.

Referring to FIG. 1, one embodiment of a conveyor belt assembly made in accordance with the present invention is illustrated. The conveyor belt assembly includes a conveyor belt 10 extending about a pulley supported by rotatable shaft 12. A feed material dispenser 14 is shown loading conveyor belt 10 with a particulate material 16 that is to be transported downstream.

The conveyor belt assembly is supported by a conveyor frame 18. In this embodiment, mounted on top of conveyor frame 18 on each side of conveyor belt 10 are take-up frame assemblies generally 20 and 22 made in accordance with the present invention. Take-up frame assembly 20 is also illustrated in FIG. 2.

Take-up frame assemblies 20 and 22 are adapted to receive each end of shaft 12. Take-up frame assemblies 20 and 22 also are configured to apply a substantially constant force to each end of shaft 12 for maintaining a substantially constant tension within conveyor belt 10.

Figure 2:
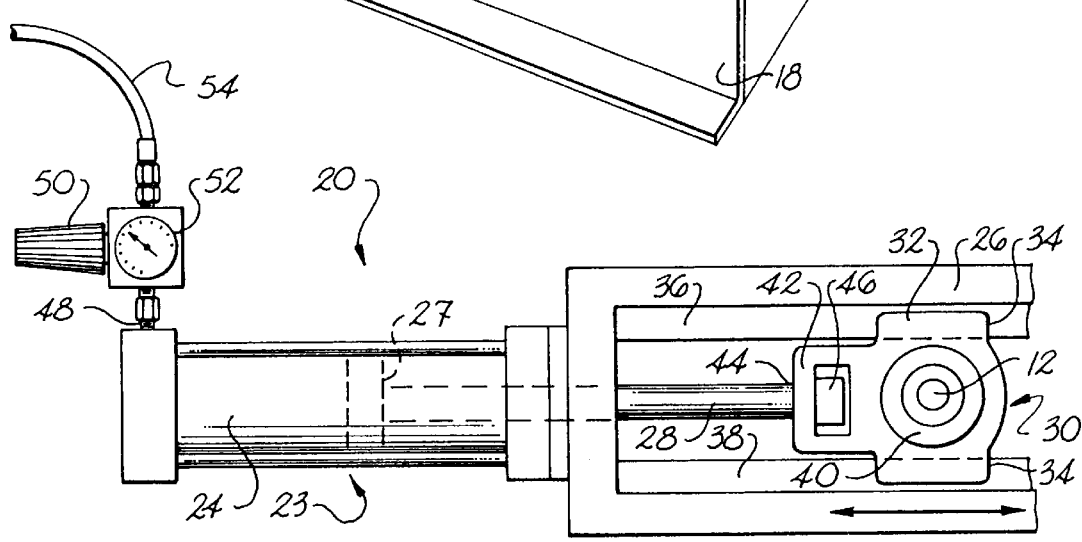
FIG. 2 is a side view with cut away portions of the take-up frame assembly illustrated in FIG. 1.

As shown in FIGS. 1 and 2, take-up frame assembly 20 includes, in this embodiment, a pneumatic cylinder device 23 mounted to a take-up frame 26. Cylinder device 23 includes a hollow cylinder 24 having therein an internal piston 27 that moves back and forth depending on the air pressure in cylinder 24. A piston rod 28 is connected to the piston and extends into a channel defined by take-up frame 26. Piston rod 28 is interconnected with a bearing block assembly generally 30.

Bearing block assembly 30 is provided within the confines of take-up frame 26 and includes a bearing block 32. Block 32 defines appropriately sized slots 34 at its top and bottom, as shown. Slots 34 mate with guide elements 36 and 38 of take-up frame 26 for movement therealong.

A bearing 40, mounted to bearing block 32, defines a shaft receiving opening into which shaft 12 is supported for rotation. Typically, bearing block 32 will have opposing ring elements with a plurality of bearing elements therebetween. One of the ring elements will rotate with shaft 12, whereas the other ring element will remain stationary relative to block 32. In some embodiments, the stationary ring element may be integrated with block 32. It should also be appreciated that any suitable type of bearing may be used for this purpose.

Bearing block 32 includes an extending portion 42, which defines an opening 44 (as indicated in FIG. 2) for receiving piston rod 28. A nut 46 is located within extending portion 42 and is connected to piston rod 28 for interconnecting the piston to bearing block 32.

Pneumatic cylinder device 23 includes a fluid inlet 48 which is in communication with a fluid regulator 50. Fluid regulator 50, which can include a pressure gauge 52, is connected to an inlet hose 54.

During operation, a pressurized fluid such as air is fed into cylinder 24 through inlet hose 54. Fluid regulator 50 is used to maintain a substantially constant pressure at a preselected level within cylinder 24 as may be indicated on pressure gauge 52. As pressurized fluid is fed into cylinder 24, the piston, and thus piston rod 28, is pushed outward delivering a substantially constant force to an end of rotatable shaft 12. By maintaining the desired pressure within cylinder 24, piston rod 28 delivers a constant force to shaft 12 which thereby maintains conveyor belt 10 under substantially constant tension.

During use, the position of bearing block 32 within take-up frame 26 will vary depending on the load placed upon conveyor belt 10. Pneumatic cylinder device 23 applies a substantially constant force to bearing block 32 without requiring the bearing block or the shaft to remain in a set position. In this manner, take-up assembly 22 is adapted to compensate for shock loading and provides cushioning for conveyor belt 10 as it moves along the conveyor system.

Pressure gauge 52 indicates the pressure within cylinder 24. Pressure gauge 52 can also be used as an indication of the amount of tension in the belt. In the take-up frame assembly of the present invention, the amount of pressure maintained within cylinder 24 is directly related to the amount of tension that is maintained within the conveyor belt.

In the embodiment of the conveyor belt assembly illustrated in FIG. 1, a take-up frame assembly made in accordance with the present invention is placed at opposite ends of rotatable shaft 12. Through this arrangement, take-up frame assemblies 20 and 22 can be used to maintain conveyor belt 10 in alignment by varying the amount of force applied to each end of the shaft. It is within the scope of the present invention, however, that more or less take-up frame assemblies can be placed in association with shaft 12.

Figure 3:
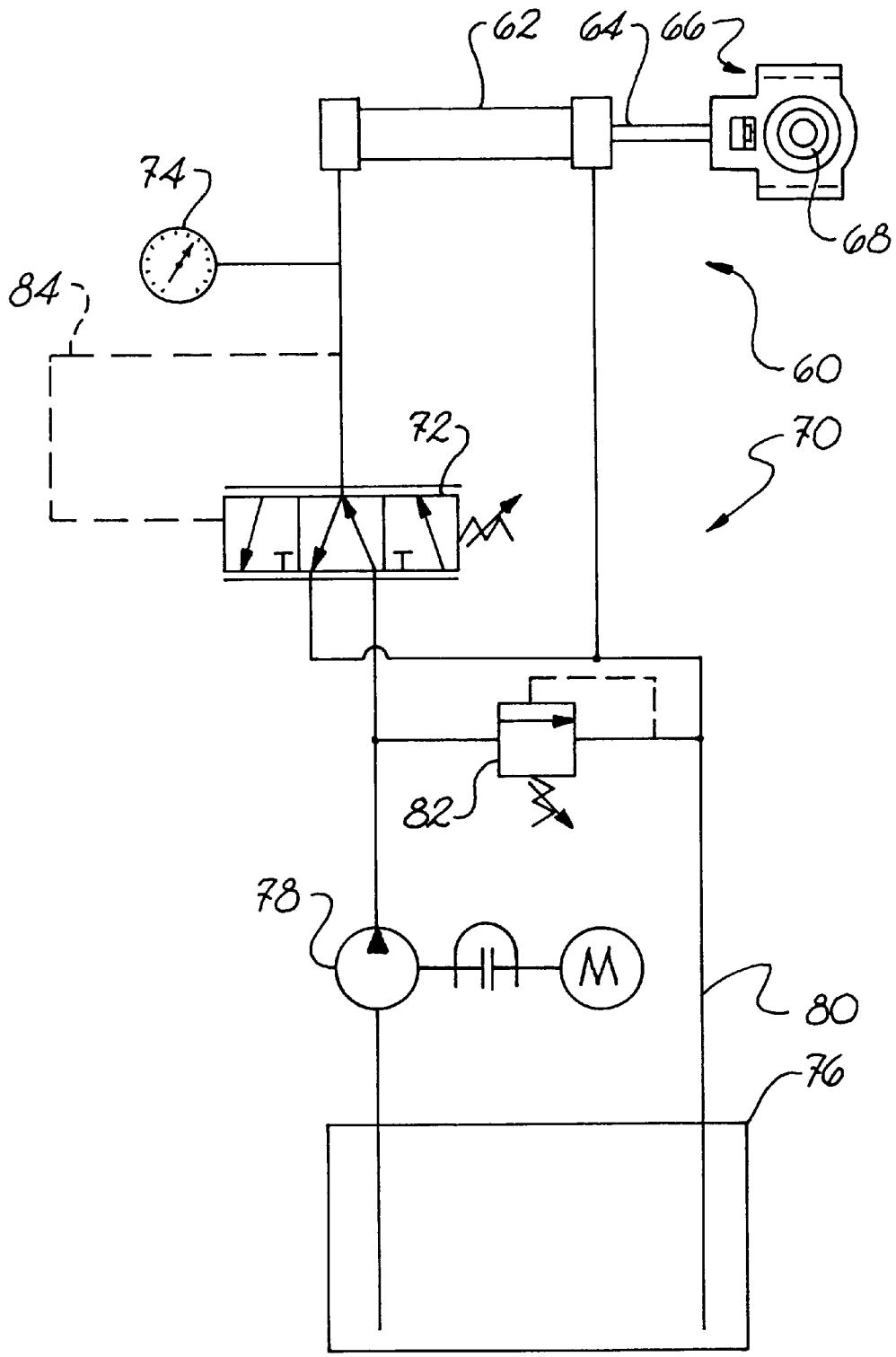
FIG. 3 is a diagrammatic view of a hydraulic cylinder and fluid circulation loop which may be used in the take-up frame assembly of the present invention.

Besides pneumatic cylinders, the take-up frame assembly of the present invention can also be used in conjunction with a hydraulic cylinder as shown in FIG. 3. Referring to FIG. 3, a take-up frame assembly generally 60 is illustrated including a hydraulic cylinder device 62. Device 62 includes a retractable piston to which a piston rod 64 is attached. Rod 64 is in turn connected to a bearing block assembly 66. Bearing block assembly 66 is adapted to rotatably support a shaft 68.

As shown in FIG. 3, cylinder device 62 is in communication with a hydraulic circulation loop generally 70 which supplies a pressurized hydraulic fluid to the cylinder. Hydraulic circulation loop 70 includes a fluid regulator 72 and a pressure gauge 74. Fluid regulator 72 maintains a hydraulic fluid at a preselected pressure within cylinder device 62. Hydraulic fluid is fed into cylinder device 62 from a fluid reservoir 76 by a hydraulic pump 78. In order to prevent pressure buildup, hydraulic circulation loop 70 includes a relief valve 82 in communication with a return conduit 80. Return conduit 80 allows hydraulic fluid to return to fluid reservoir 76. Hydraulic circulation loop 70 can also include a pressure relief conduit 84 as shown in dotted configuration.

Hydraulic circulation loop 70 supplies a pressurized hydraulic fluid to hydraulic cylinder device 62 which, in turn, applies a force to rotatable shaft 68. As shown in the embodiment illustrated in FIG. 3, a single hydraulic cylinder can be in communication with a corresponding hydraulic circulation loop. Alternatively, hydraulic circulation loop 70 can be adapted to supply hydraulic fluid to more than one hydraulic cylinder.

Besides being adapted to maintain a conveyor belt under substantially constant tension, the take-up frame assembly of the present invention can also be used to automatically maintain a conveyor belt in proper alignment. In the past, tracking problems have been experienced in many conveyor belt systems. For example, tension variations, temperature fluctuations, load distributions, and belt wear can all affect the alignment of a belt.

Figure 4:
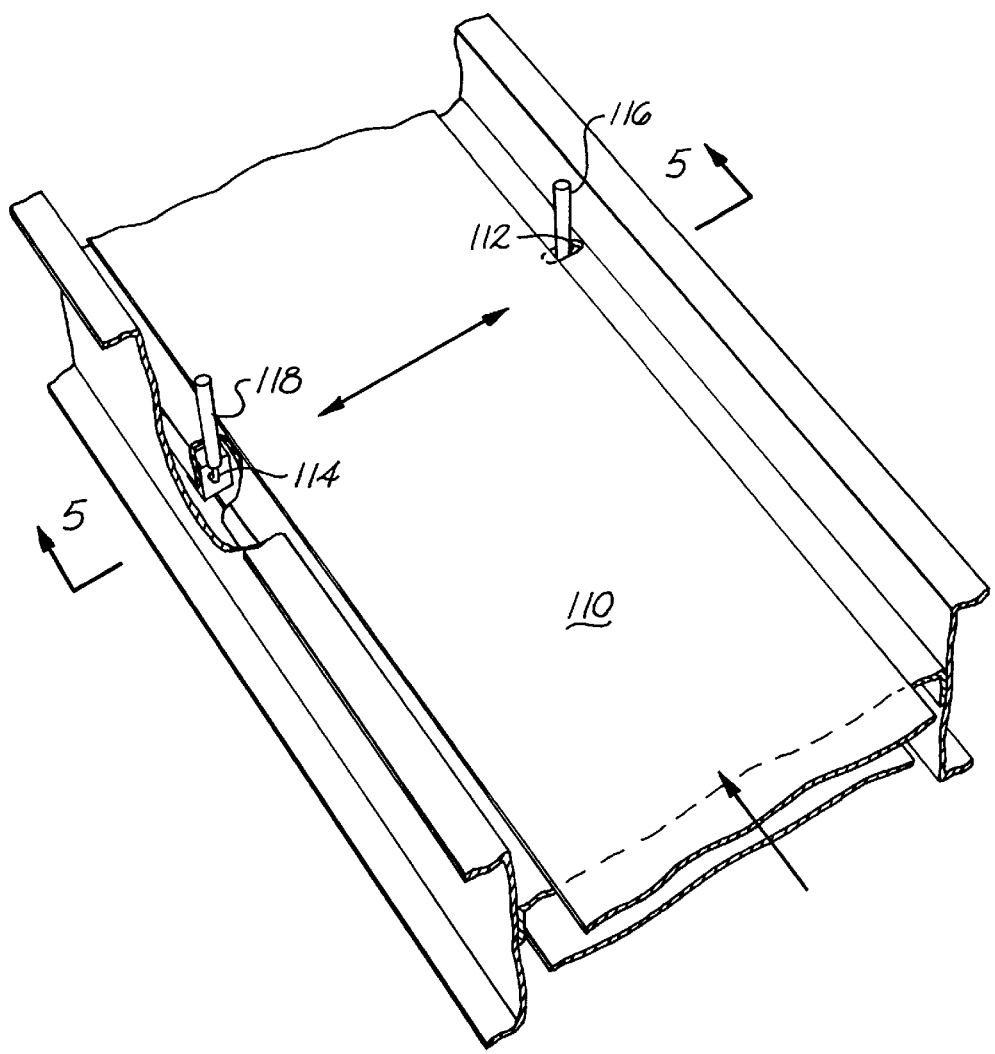
FIG. 4 is a perspective view with cut away portions of a pair of opposing belt alignment devices in relation to a conveyor belt.
Figure 5:
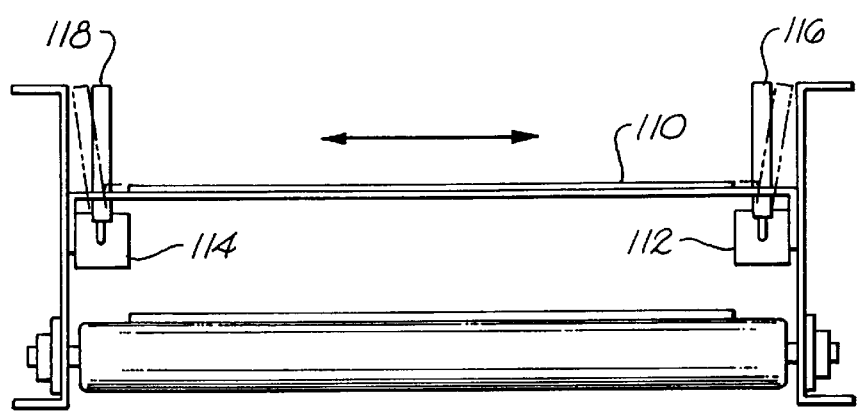
FIG. 5 is a cross sectional view of the conveyor and belt alignment devices as taken along line 5—5 of FIG. 4.
Figure 6:
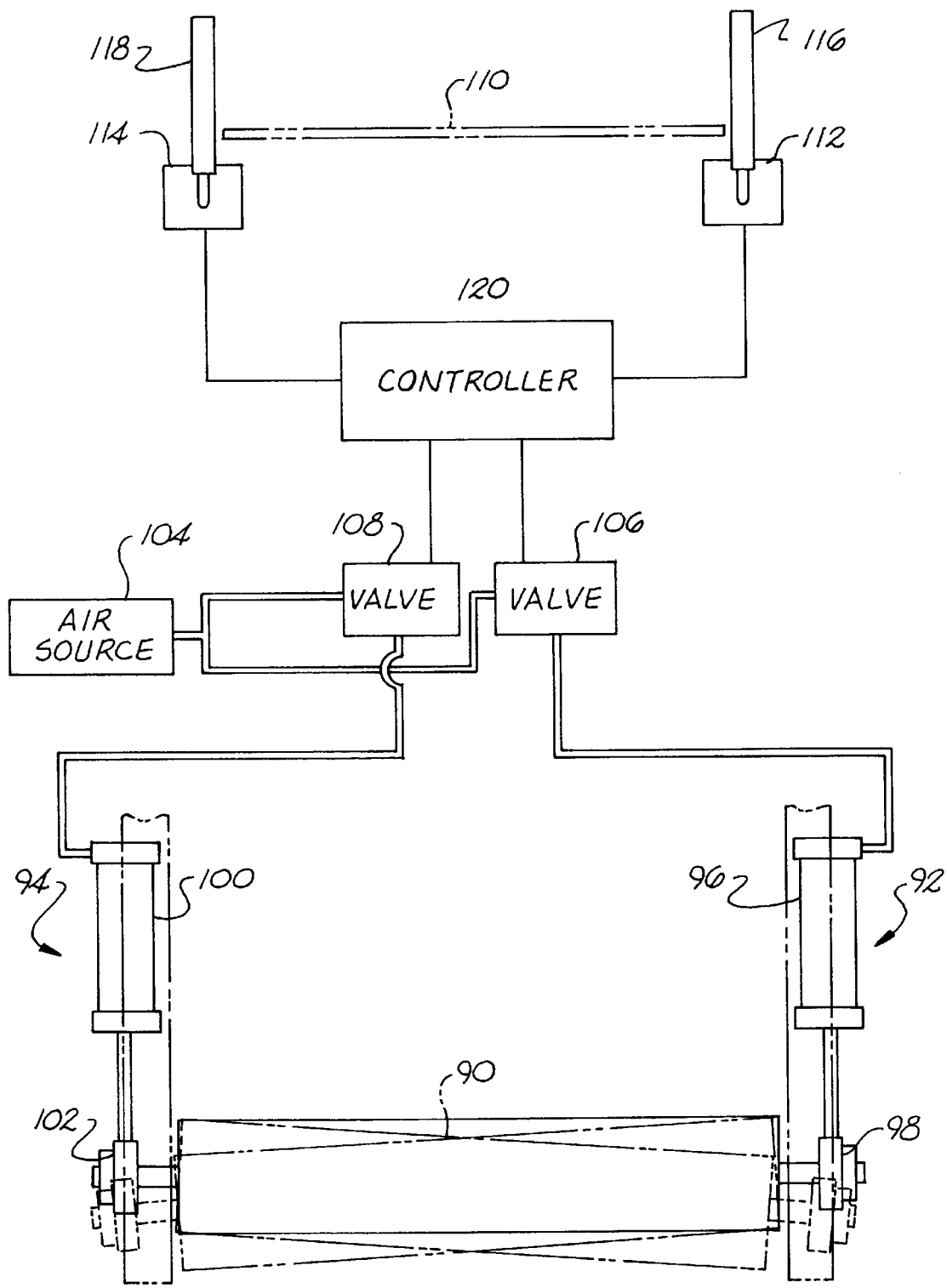
FIG. 6 is a diagrammatic view of a take-up frame assembly and belt tracking system made in accordance with the present invention.

Referring to FIGS. 4 and 5 and particularly to FIG. 6, one embodiment of a belt alignment system made in accordance with the present invention is illustrated. As shown in FIG. 6, the alignment system includes a rotatable pulley and shaft assembly 90 supported at one end by a take-up frame assembly 92 and at an opposite end by a take-up frame assembly 94. Take-up frame assembly 92 includes a fluid cylinder, such as a pneumatic cylinder 96 interconnected with a bearing 98. Similarly, take-up frame assembly 94 includes a pneumatic cylinder 100 interconnected with a bearing 102. Pneumatic cylinders 96 and 100 are each in communication with a fluid source, here air source 104. A fluid regulator 106 (labelled "valve") controls the air pressure within pneumatic cylinder 96 while fluid regulator 108 (labelled "valve") controls the air pressure within pneumatic cylinder 100.

As more particularly shown in FIGS. 4 and 5, in order to monitor the relative alignment of a conveyor belt 110, the belt alignment system of the present invention includes one or more suitable detector devices that function to indicate lateral movement of belt 110. In this case, a pair of belt alignment devices 112 and 114 are provided, respectively positioned adjacent to opposite edges of the conveyor belt. While various types of detectors may be provided for this purpose, in this embodiment, belt alignment devices 112 and 114 include respective roller arms 116 and 118 which are capable of pivoting when contacted with conveyor belt 110. When roller arm 116 or roller arm 118 is pivoted, the respective of belt alignment devices 112 and 114 will produce a signal indicating the degree of belt misalignment that has occurred. Belt alignment devices as shown in the figures are commercially available from Conveyor Components Company in Croswell, Mich.

Referring again to FIG. 6, the belt alignment system of the present invention includes a controller 120 such as a microprocessor that is electronically connected to belt alignment devices 112 and 114 and to fluid regulators 106 and 108. Controller 120 is configured to receive information from belt alignment devices 112 and 114 regarding the relative position of conveyor belt 110. Controller 120 is also configured to automatically adjust fluid regulators 106 and 108 for varying the fluid pressure within pneumatic cylinders 96 and 100, based upon information received from belt alignment devices 112 and 114. In this arrangement, constant alignment of conveyor belt 110 is automatically facilitated without having to shut down the conveyor belt system.

For instance, should conveyor belt 110 drift to the right, the belt will contact belt alignment device 112. Belt alignment device 112 will pivot, generating a signal which will be sent to controller 120. In order to realign conveyor belt 110, controller 120 can, for instance, adjust fluid regulator 108 for reducing the fluid pressure within pneumatic cylinder 100. By reducing the pressure within fluid cylinder 100, bearing 102 will tilt slightly towards pneumatic cylinder 100 causing conveyor belt 110 to realign. Alternatively, or in addition, pneumatic cylinder 96 can be actuated to push bearing 98 in an away direction.

While presently preferred embodiments of the invention have been described herein, modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A take-up frame assembly adapted to supply a substantially constant force to a load bearing shaft comprising:
    a bearing adapted to rotatably receive a shaft in a first direction, said bearing being movable in a second direction substantially perpendicular to said first direction;
    a fluid cylinder in operative association with a movable piston, said piston being interconnected with said bearing, said fluid cylinder including a fluid inlet for receiving a pressurized fluid, wherein, when a pressurized fluid is introduced into said cylinder, said piston applies a force to said bearing in said second direction; and
    a fluid regulator in communication with said fluid inlet for controlling and regulating the pressure of a fluid within said cylinder, said fluid regulator controlling the amount of fluid entering and exiting said fluid cylinder from a pressurized fluid source, wherein said fluid regulator is configured to maintain a fluid at a substantially constant pressure in said cylinder as different loads are applied to said load bearing shaft such that said piston applies a substantially constant force to said bearing as said loads vary.

2. A take-up frame assembly as defined in claim 1, wherein said fluid cylinder is a pneumatic cylinder.

3. A take-up frame assembly as defined in claim 1, wherein said fluid cylinder is a hydraulic cylinder.

4. A take-up frame assembly as defined in claim 1, further comprising a pressure indicator for indicating the pressure of a fluid within said cylinder.

5. A take-up frame assembly as defined in claim 1, further comprising a bearing frame, said bearing being movably secured along said second direction within said bearing frame.

6. A take-up frame assembly as defined in claim 5, wherein said bearing frame includes guide elements defining an elongated channel, said bearing being movable along said guide elements within said elongated channel.

7. A take-up frame assembly as defined in claim 1, further comprising a bearing block connected to said retractable piston, said bearing being mounted to said bearing block.

8. A take-up frame assembly as defined in claim 3, further comprising a hydraulic circulation loop in communication with said hydraulic cylinder, said hydraulic circulation loop including a fluid reservoir and a hydraulic pump for supplying a hydraulic fluid to said hydraulic cylinder.

9. A conveyor belt assembly comprising:
    a conveyor belt;
    a rotatable shaft adapted to support and rotate with said conveyor belt, said rotatable shaft having a first end and a second end;
    a first bearing mounted to said first end of said rotatable shaft and a second bearing mounted to said second end of said rotatable shaft;
    a first fluid cylinder in operative association with a first movable piston, said first movable piston being interconnected with said first bearing for applying tension to said conveyor belt and a second fluid cylinder in operative association with a second movable piston, said second movable piston being interconnected with said second bearing for supplying a force to said second end of said shaft for applying tension to said conveyor belt, wherein each of said fluid cylinders includes a fluid inlet for receiving a pressurized fluid such that when a pressurized fluid is received within each of said cylinders, said respective pistons apply a force to said rotatable shaft;
    a first fluid regulator in communication with said fluid inlet on said first fluid cylinder and a second fluid regulator in communication with said fluid inlet on said second fluid cylinder, said fluid regulators controlling the amount of fluid entering and exiting said fluid cylinders from a pressurized fluid source, wherein said fluid regulators are configured to maintain a fluid at a substantially constant pressure in said cylinders as different loads are applied to said conveyor belt such that said pistons apply a substantially constant force to said rotatable shaft as said loads vary when said conveyor belt is in alignment;
    a detection mechanism for sensing a deviation of said conveyor belt from a position of alignment;
    a controller configured to receive information from said detection mechanism regarding the position of said conveyor belt, said controller being configured to adjust said first and second fluid regulators for controlling the pressure of a fluid within each of said fluid cylinders for altering the force applied to each end of said rotatable shaft in order to align said conveyor belt.

10. A conveyor belt assembly as defined in claim 9, wherein each of said fluid cylinders comprise pneumatic cylinders.

11. A conveyor belt assembly as defined in claim 9, wherein each of said fluid cylinders comprise hydraulic cylinders.

12. A conveyor belt assembly as defined in claim 9, wherein said controller comprises a microprocessor.

13. A conveyor belt assembly as defined in claim 9, further comprising a first bearing frame and a second bearing frame, said first bearing being movably secured within said first bearing frame and said second bearing being movably secured within second bearing frame.

14. A conveyor belt assembly as defined in claim 13, wherein each of said first and second bearing frames include guide elements defining an elongated channel, each of said first and second bearings being movably secured along said guide elements in a direction substantially perpendicular to the axial direction of said rotatable shaft.

15. A conveyor belt assembly as defined in claim 9, wherein said detection mechanism comprises a pair of opposing conveyor alignment devices for sensing the position of opposite edges of said conveyor belt.

16. A take-up frame assembly comprising:
- a rotatable shaft adapted to support and rotate with a moving conveyor, said rotatable shaft having a first end and a second end;
- a first bearing mounted to said first end of said rotatable shaft and a second bearing mounted to said second end of said rotatable shaft;
- a first fluid cylinder in operative association with a first movable piston, said first movable piston being interconnected with said first bearing, and a second fluid cylinder in operative association with a second movable piston, said second movable piston being interconnected with said second bearing, each of said first and second fluid cylinders including a fluid inlet for receiving a pressurized fluid;
- a first fluid regulator in communication with said fluid inlet on said first fluid cylinder and a second fluid regulator in communication with said fluid inlet on said second fluid cylinder, said first and second fluid regulators controlling and regulating the pressure of a fluid within each of said cylinders, said fluid regulators controlling the amount of fluid entering and exiting said fluid cylinders from a pressurized fluid source;
- a controller in communication with said first and second regulators, said controller controlling said first and second regulators for adjusting the pressure of a fluid within said fluid cylinders, wherein said first and second fluid regulators and said controller are normally configured to maintain a fluid at a substantially constant pressure within said fluid cylinders as different loads are applied to a conveyor supported by said rotatable shaft such that, said respective movable pistons apply a substantially constant force to each end of said rotatable shaft for placing said conveyor under substantially constant tension as said loads vary and while said conveyor remains in alignment; and
- a first conveyor alignment device adapted to sense the position of an edge of said conveyor supported by said rotatable shaft and a second conveyor alignment device adapted to sense the position of an opposite edge of said conveyor, each of said first and second conveyor alignment devices sending information to said controller, wherein, based upon said information received from each of said first and second conveyor alignment devices, said controller adjusts each of said first and second fluid regulators in order to align said conveyor.

17. A take-up frame assembly as defined in claim 16, wherein said first fluid cylinder and said second fluid cylinder are pneumatic cylinders.

18. A take-up frame assembly as defined in claim 16, wherein said first fluid cylinder and said second fluid cylinder are hydraulic cylinders.

19. A take-up frame assembly as defined in claim 16, wherein said controller comprises a microprocessor.

20. A take-up frame assembly as defined in claim 16, further comprising first and second bearing frames positioned adjacent to opposite sides of a conveyor supported by said rotatable shaft, said first bearing and said second bearing being movably secured within respective of said bearing frames.

* * * * *